United States Patent [19]

Daouse et al.

[11] Patent Number: 5,031,567
[45] Date of Patent: Jul. 16, 1991

[54] APPARATUS FOR PREPARING PORTIONS OF PASTE-FORM PRODUCTS

[75] Inventors: Alain Daouse, Noailles; Bruno Delande, Marseille en Beauvaisis, both of France

[73] Assignee: Nestec S.A., Vevey, Switzerland

[21] Appl. No.: 439,446

[22] Filed: Nov. 20, 1989

[30] Foreign Application Priority Data

Dec. 15, 1988 [EP] European Pat. Off. ........ 88120981.1

[51] Int. Cl.⁵ .................... A23G 9/14; A23G 9/28; A23G 9/30
[52] U.S. Cl. .......................... 118/15; 118/20; 118/23; 118/24; 141/86; 222/108; 425/104; 425/133.1; 425/161; 425/215; 425/308
[58] Field of Search .............. 425/90, 104, 105, 131.1, 425/161, 215, 227, 308, 311, 313, 133.1; 118/13, 20, 300, 324, 15, 23, 24; 222/108, 148; 137/312; 141/86–88, 91

[56] References Cited

U.S. PATENT DOCUMENTS

| 2,874,734 | 2/1959 | Luckock et al. | 141/87 |
| 3,029,750 | 4/1962 | Burt, Jr. et al. | 425/215 |
| 4,174,742 | 11/1979 | Murphey | 141/87 |
| 4,189,289 | 2/1980 | Getman | 425/93 |
| 4,767,304 | 8/1988 | Tashiro | 425/308 |
| 4,854,842 | 8/1989 | Kobayashi | 425/308 |
| 4,925,689 | 5/1990 | Getman | 425/308 |

FOREIGN PATENT DOCUMENTS 230368 7/1987 European Pat. Off. ............ 425/308

Primary Examiner—James C. Housel
Attorney, Agent, or Firm—Vogt & O'Donnell

[57] ABSTRACT

Paste-form material is shaped into individual portions by an apparatus wherein a feed pipe provides a continuous supply of paste-form product under pressure to a distributor which is synchronized with a cutting device to produce the individual portions which are delivered to a support. Elements of the cutting device collect drops produced when cutting the distributed paste-form product, and the collected drops are removed from the cutting device such that the drops do not come in contact with the support.

16 Claims, 3 Drawing Sheets

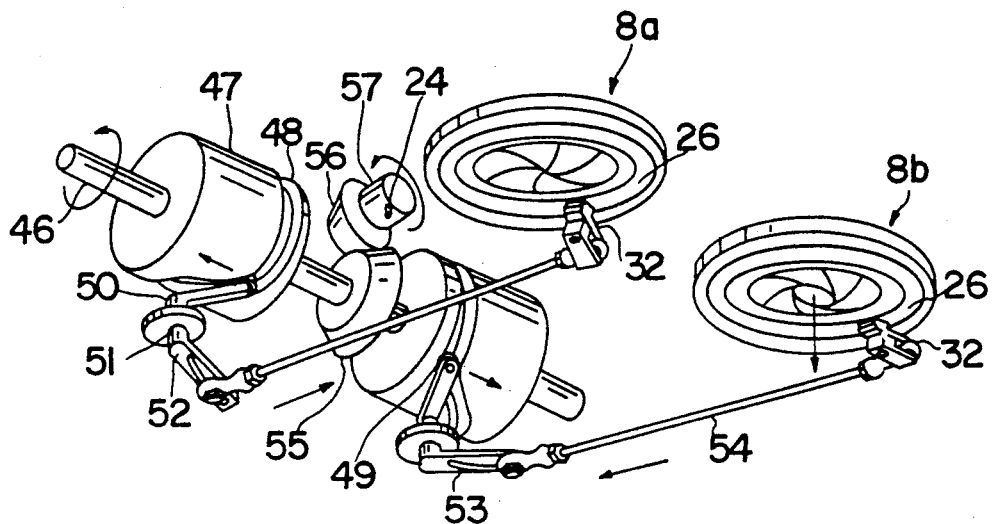
FIG.5
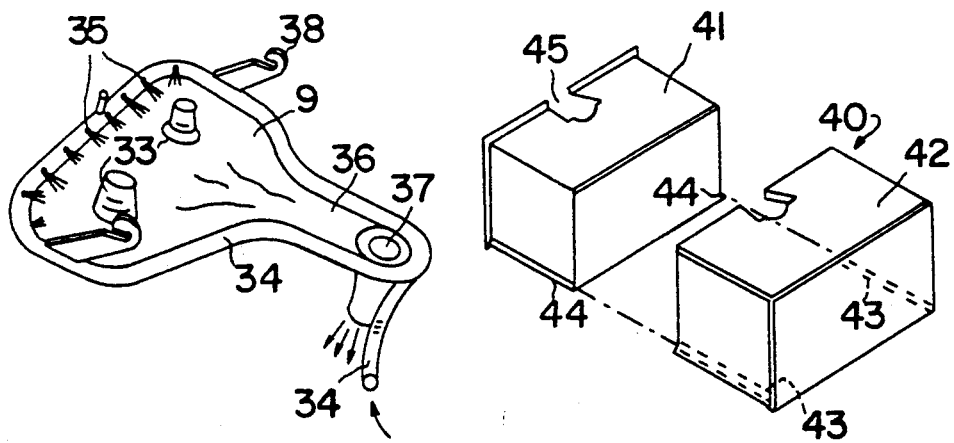
FIG.6
FIG.7

APPARATUS FOR PREPARING PORTIONS OF PASTE-FORM PRODUCTS

BACKGROUND OF THE INVENTION

This invention relates to a device for continuously shaping confectionery into individual portions of regular shape from a strand of paste-form product.

There are various ways of shaping ice-cream confectionery into generally rounded portions a mouthful in size.

The installation according to U.S. Pat. No. 4,530,214, for example, comprises an endless chain of elements bearing cell moulds which are filled with ice cream. The chain passes through a freezing tunnel, and on leaving the tunnel, the moulds are heated and then tilt under the effect of a cam in the form of a rail, pivoting about a hinge on the element, after which the portions are demoulded by air blown in through the bottom of the cells. An installation such as this enables ice-cream bonbons to be produced at a high rate, but is attended by disadvantages. The stainless steel moulds represent a considerable investment, and if it is desired to change the shape of the articles, the entire set of moulds has to be changed. The moulds deteriorate rapidly on account of the mechanical and thermal stressing which they undergo. Finally, they are difficult to clean to the extent that the installation involves risks from the point of view of hygiene.

In another installation described for example in U.S. Pat. No. 4,674,968, ice cream balls are made by filling a spherical mould of which the lower hemisphere opens by pivoting into two parts while a scraper arc detaches the ball from the upper hemisphere. The adjustment of an installation such as this to obtain portions of constant shape is extremely involved. In addition, the production rate is necessarily limited.

There are devices which shape meat or potato balls at a high rate using diaphragms. The problem with these known devices is that they are not suitable for ice-cream confectionery.

The control means are close to the supply of paste-form product which induces thermal influences incompatible with the production of uniformly shaped portions.

The friction of the diaphragms on the ice-cream confectionery heats the confectionery and produces drops which fall onto the support. This is not compatible with hygienic production.

Finally, when there are several coupled diaphragms, the construction is such that the diaphragms are subjected to different accelerations during opening and closing. For aerated ice-cream confectionery, which is compressible in character, this means an undesirable variability in shape during its continuous supply under constant pressure. The same problem does not arise in the case of meat or potato balls which are relatively incompressible.

GB-A 2,172,541 relates to a device for shaping ice-cream confectionery on a support comprising a shaping head supplied with paste-form product, a distributor for the strand of paste-form product, a diaphragm for cutting the strand into portions and synchronized control means for the distributor and the diaphragm so that individual spherical portions are produced from the strand. According to this patent application, the problem of the compressibility of the ice-cream confectionery is solved by coupling the rotational reciprocating movement of the diaphragm with a pressure variator inside the shaping chamber. A device such as this allows only a limited production rate. In addition, it ignores the hygiene problems associated with the formation of drops.

SUMMARY OF THE INVENTION

The device according to the invention enables the disadvantages of known devices to be obviated.

The present invention is characterized in that a supply of paste-form product takes place continuously under constant pressure, cutting means are provided with elements for collecting drops produced by the heating of the strand on contact with the cutting means during formation of the portions and in that the device comprises means for removing the drops so that they do not come into contact with a support upon which the portions are delivered.

With more particularity, the present invention is characterized in that a feed pipe provides a supply of paste-form product under pressure to a distributor connected to the feed pipe which receives the supply of paste-form product from the feed pipe and distributes it to piping connected to the distributor and in that cutting means receive the distributed paste-form material from the piping for cutting the distributed paste-form material into individual portions which are then deposited upon a support positioned for receiving the individual portions from the cutting means. The present invention is characterized further in that distributor and cutting means control means are synchronized for controlling the distributor and cutting means such that the individual portions produced by the distributor and cutting means have a uniform shape, in that cutting means elements collect drops produced when cutting the distributed paste-form product into individual portions and in that there are means for removing the drops collected by the cutting means elements from the cut-ting means such that the drops do not come in contact with the support.

The invention also relates to an installation for the continuous production of ice-cream confectionery products characterized in that it comprises the shaping device according to the invention, a tunnel for cooling the portions and a unit for coating the portions.

The accompanying drawings illustrate one particular example of embodiment of the invention. In these drawings, the same reference numerals denote the same elements.

BRIEF DESCRIPTION OF THE DRAWINGS

FIG. 5 is a perspective view of a synchronized control means.

FIG. 6 is a perspective view of a drop removing means.

FIG. 7 is an exploded view of an isothermal cover of the head.

DETAILED DESCRIPTION OF THE DRAWINGS

Figure 1:
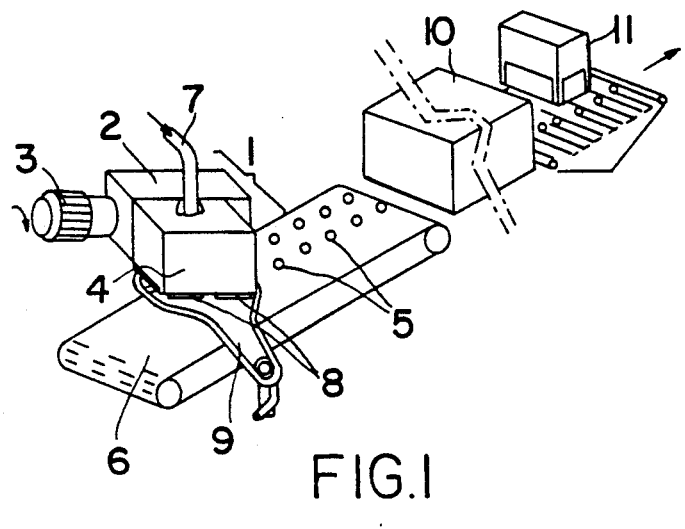
FIG. 1 diagrammatically illustrates part of an installation for the production of ice-cream confectionery.

Referring to FIG. 1, the shaping device 1 comprises a housing 2 accommodating the control means shown in detail in FIG. 5, a motor 3 for driving the control means and a shaping head 4 which delivers portions 5 onto the conveyor belt 6. The shaping head is fed with a paste-form strand of ice-cream confectionery through the pipe 7, the strand being divided into portions by the cutting means 8. A trough 9 collects the drops produced by the heating of the ice-cream confectionery during cutting. The portions are guided towards a cooling tunnel 10 and are then coated at 11.

Figure 2:
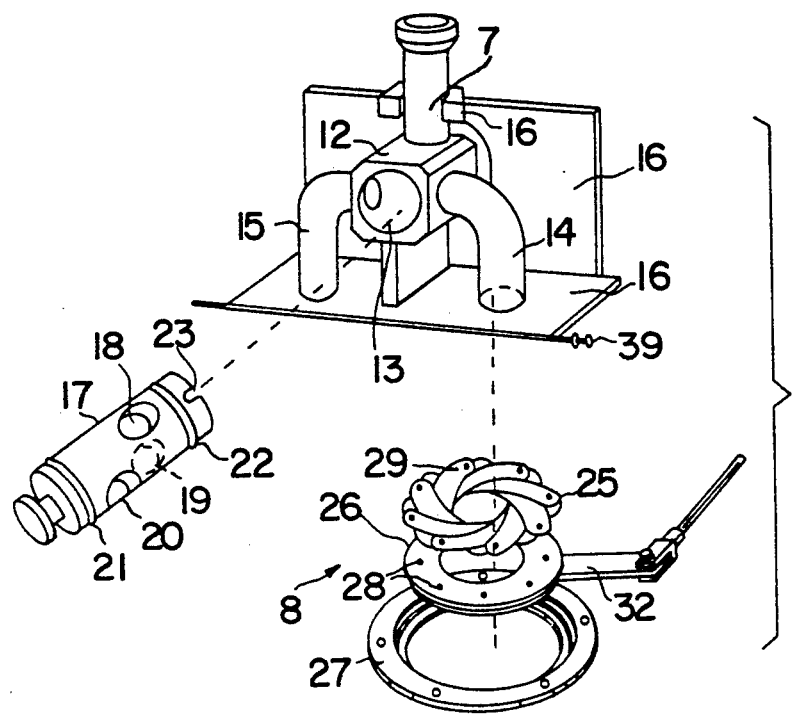
FIG. 2 is a perspective exploded view of a shaping head with one dividing means.

The shaping head shown in FIG. 2 comprises a feed pipe 7 for ice-cream confectionery which opens into a block 12 recessed to form a cylindrical chamber 13 from above and towards the rear of the chamber. On either side of the chamber 13 and towards the front, openings are formed in the outlet pipes 14 and 15. The block and the pipes are held by a support 16. The distributor for the paste-form strand is a one-piece cylindrical plug 17 adapted to the chamber 13. At its rear end, the plug comprises diametrically opposite orifices 18 and 19 designed to communicate with the pipe 7. At its front end, the plug comprises an orifice 20 designed to communicate with the pipes 14 and 15, as will be explained in more detail hereinafter with reference to FIG. 4. The machined orifices are preferably rounded with no connecting angles. During movement, a sealing effect is provided by 0 rings 21 and 22 which are respectively on this side of the pipe 7 and beyond the pipes 14 and 15. The plug is closed at its two ends. An indent 23 formed in the rear part of the plug engages with the pin 24 on the drive shaft of the plug, as will be explained hereinafter with reference to FIG. 5.

The cutting means 8 illustrated in an exploded manner in FIG. 2 are diaphragms formed by an assembly of blades 25, an actuator 26 and a guide and fixing ring 27 for fixing to the support 16. The actuator 26 is provided on its surface opposite the blades 25, around its periphery and in its thickess with holes 28 which are designed to receive corresponding studs 29 on the blades.

Figure 3:
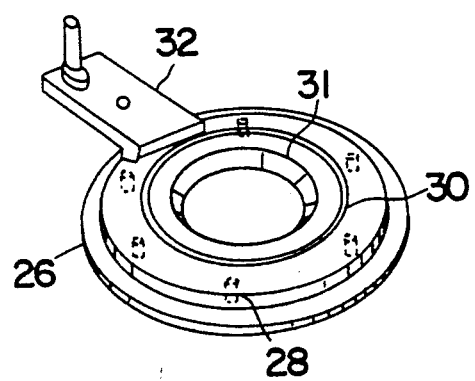
FIG. 3 is a perspective detailed view from below of a diaphragm-actuating element.

As shown in FIG. 3, an annular groove 30 is formed in the middle part of that surface of the actuator 26 which is opposite the blades. The central part of the actuator 26 is recessed in the shape of a counter-cone 31 of which the slope is accentuated, for example of the order of 60°. When the diaphragm is operating at a fast rate, the heating of the ice-cream confectionery due to the friction of the blades produces drops which are dispersed by the counter-cone 31 towards the groove 30. Their dropping points are thus controlled. The actuator 26 has an arm 32 which controls the diaphragm, as will be explained hereinafter with reference to FIG. 5.

The block 12 and the support 16 of the shaping head, the pipes 7, 14 and 15, the blades 25 and the actuator 26 are advantageously made of stainless steel so that they are easy to clean. The plug 17 and the guide ring 27 are advantageously made of a plastics material, preferably a thermoplastic polyester, for example polyethylene terephthalate which has a high creep resistance and a low and constant coefficient of friction which provides in particular for good sliding on stainless steel.

The production tolerances of the components 17 and 27 are preferably narrow to ensure good guiding and optimal sealing between the moving parts.

In FIG. 6, the means for removing the drops are in the form of a trough 9, for example of stainless steel, arranged between the shaping head 4 (FIG. 1) and the conveyor belt 6 (FIG. 1). The trough is holed by sleeves 33 substantially frustoconical in shape which are arranged opposite the outlet pipes 14, 15 just beneath the diaphragm cutting means 8. A ramp 34 for spraying water in the form of flat jets 35 is placed around the periphery of the trough and facilitates removal of the drops collected in the groove 30 which drop down the outside of the sleeve 33 and are entrained by the water in the sloping channel 36 into the pipe 37. The portions 5 (FIG. 1) fall through the sleeve 33 without touching it onto the conveyor belt. The trough is detachable and has no sharp edges so that it is easy to clean. Its distance from the conveyor belt is preferably slightly more than the height of a portion. It is suspended by hooks 38 from a rod 39 of the support 16 (FIG. 2).

The feed and outlet pipes, the block and the plug of the shaping head are inside an isothermal cover which is shown in FIG. 7. This cover enables the parts in contact with the ice cream to be separated from the control means of the diaphragm cutting means and the plug and from the surrounding environment. This prevents changes in the shape of the portions which could be caused by outside thermal influences, for example a current of air or heating due to the motor. The cover 40 consists of two superposed walls, the inner wall 41 of a heat-conducting material, for example a lightweight alloy, and the outer wall 42 of a heat-insulating material, for example transparent polycarbonate. An air space separates the two walls. Advantageously, the outer wall 42 is provided on its two inner, lateral small faces with grooves 43 in which engage corresponding rails 44 on the corresponding outer lateral faces of the inner wall 41. The locking system of the cover does not require screws or adapted moving parts. The shape of the indent 45 adapted to the support 16 prevents the cover from sliding.

Figures 4A, 4B:
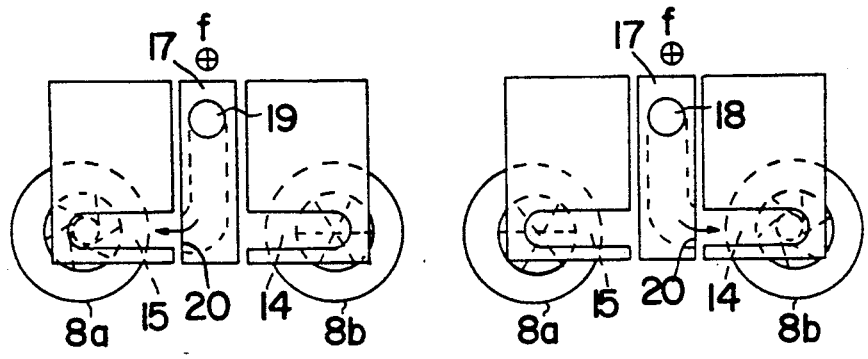
FIG. 4 diagrammatically illustrates the operation of a distributing element (4a, 4b).

The mode of operation of the shaping device is shown in FIGS. 4 and 5. In FIG. 5, the shaft 46 is continuously rotated by the motor 3 (FIG. 1), preferably equipped with a variable transmission. At each end, this shaft has a cam 47 in the groove 48 of which runs a roller 49 carried by an arm 50. This arm pivots about a fixed axis 51 and is integral with a crank 52 formed with an arcuate groove 53 for control of the lever arm. The crank 52 is connected to a link 54 which itself is pivotally mounted on the arm 32 of the diaphragm cvutting means actuator 26 (FIG. 3). The various parts are controlled in such a way that, when the diaphragm 8b is fully open, the diaphragm 8a is closed. The shaft 46 carries a gear 55 which engages in a gear 56 mounted on the shaft 57 perpendicularly to the shaft 46. The gears 55 and 56 thus form a 90° bevel gear for the shaft 57. The shaft 57 is provided with a pin 24 engaging in the indent 23 (FIG. 2) to rotate the plug 17, as indicated above. The position in FIG. 5 corresponds to position b in FIG. 4 in which the plug 17 communicates with the feed pipe 7 through the opening 18 (arrow f) and with the outlet pipe 14 through the opening 20. When the plug 17 has completed half a revolution, it communicates with the feed pipe 7 through the opening 19 and with the outlet pipe 15 through the opening 20. In this position, the diaphragm cutting means 8a is fully open while the diaphragm 8b is closed. The various arrows in FIG. 5 indicate the directions of movement of the parts and their correlation. It can thus be seen that the alternate opening and closing of the diaphragm cutting means provides for a continuous supply of product at a constant rate.

The axes of the two diaphragm cutting means 8a and 8b are parallel to the corresponding pivoting axis 51 of the cranks 52 and the distance between the axes of the diaphragm cutting means is identical with the distance between the axes of the cranks. The link rods 54 of the two diaphragm cutting means have the same length. The radius of curvature of the grooves 53 formed in the cranks 52 corresponds to the length of the link rods. The angular positions (opening-closing) of the actuators 26 of both diaphragm cutting means are identical which ensures the same accelerations on opening and closing and thus guarantees strictly identical shapes for the portions coming from the diaphragm cutting means.

The diameter of the portions may be adjusted without having to alter the length of the link rods 54 because the radius of curvature of the grooves 53 corresponds to that length. This prevents deterioration of the blades in the closed position because, if this were not the case, adjustment of the angular positions of the arm 32 which determines the degree of opening of the diaphragm cutting means, unless accompanied by an adjustment of the length of the link rod, would result in excessive overlapping of the blades 25, causing them to deteriorate.

In the illustrated embodiment, the portions are quasispherical in shape with a diameter of 20 to 30 mm and a weight of approximately 7.5 g. It is of course possible to change the shape of the portions, for example to produce quasi-cylindrical, ovoidal, conical or hemispherical articles, for example by modifying the line of the grooves 48 of the cams 47 which modifies the opening and closing cadence of the diaphragm cutting means. By changing the number of blades, it is possible to obtain articles of hexagonal cross-section (six blades, as in FIGS. 4 and 5) or octagonal cross-section (eight blades, as in FIG. 2). The blades of the diaphragm cutting means may also be oriented, for example so that one face of the polygons is parallel to the direction of movement of the convenyor belt, which facilitates gripping of the articles by grippers during packing. By modifying the curvature of the cutting edge of the blades, it is possible to modify the roundness of the portions. The diaphragm blades can also be designed to slide relative to one another without overlapping. The blades may be notched to produce decorative surface effects.

In the illustrated embodiment, the shaping head comprises two diaphragm cutting means. It is possible to increase the number of diaphragm cutting means and hence to provide a corresponding number of control elements driven by a corresponding number of cams.

In the interests of clarity of the drawing, the feed pipe is simple. It may be replaced by a pipe comprising separating walls or even a coaxial pipe of smaller diameter to produce two-flavoured or multi-flavoured articles by coextrusion.

In the context of the invention, ice-cream confectionery is understood to be aerated ice cream or sorbet extrudable, for example at a temperature of −5° to −7° C., and expanded, for example, to approximately 70% by volume. The ice-cream confectionery may contain pieces of, for example, preserved or dried fruit, truffle, etc.

The coating composition may be a fatty composition, for example a coating of chocolate or a fruit-flavoured coating in the case of ice cream. In the case of a sorbet, the coating may be an aqueous solution, for example a syrup. The coating composition may contain decorative particles or granules, for example of extruded casein, sugar, etc.

The device according to the invention in the embodiment illustrated enables approximately 20,000 quasi-spherical ice-cream bonbons weighing approximately 7.5 g to be produced per hour when the motor is rotating at 200 r.p.m., i.e., at very high speed, the uniformly shaped bonbons being obtained under good hygienic conditions.

We claim:

1. An apparatus for preparing paste-form products into portions comprising:
    a feed pipe for providing a continuous supply of a paste-form product under pressure;
    a distributor connected to the feed pipe for receiving the supply of the paste-form product from the feed pipe and for distributing the paste-form product received from the feed pipe;
    piping connected to the distributor for receiving the paste-form product distributed by the distributor;
    cutting means connected to the piping for receiving the distributed paste-form material from the piping and for cutting the distributed paste-form material into individual portions;
    means synchronized for controlling the distributor and cutting means such that the individual portions produced by the distributor and cutting means have a uniform shape;
    a support positioned for receiving the individual portions from the cutting means;
    cutting means elements for collecting drops produced when cutting the distributed product into individual portions; and
    means for removing the drops collected by the cutting means elements from the cutting means such that the drops do not come into contact with the support.

2. An apparatus according to claim 1 wherein the cutting means comprises an assembly of blades facing an outlet of the piping connected to the distributor and wherein the cutting means elements for collecting drops comprises an annular blade actuator having a first surface facing and being connected to the assembly of blades for driving the blades and a second surface opposing the first surface which has a circular groove disposed in a middle part thereof and a recess in a shape of a countercone in a central part thereof for dispersing drops from the blades towards the groove.

3. An apparatus according to claim 1 or 2 wherein the means for removing the drops comprises a trough positioned between the cutting means and the support which is embodied such that the cut portions pass from the cutting means to the support and such that the trough receives drops collected by the cutting means elements and removes the collected drops such that the drops do not come into contact with the support.

4. An apparatus according to claim 3 wherein the trough has a water spray ramp about its periphery which communicates with a channel connected to a pipe for removal of collected drops and removal of water from the trough away from the support.

5. An apparatus according to claim 3 wherein the trough has a substantially frustoconical sleeve extending towards the cutting means embodied so that the cut portions fall through the sleeve of the trough to the support.

6. An apparatus according to claim 4 wherein the trough has a substantially frustoconical sleeve extending towards the cutting means embodied so that the cut portions fall through the sleeve of the trough to the support.

7. An apparatus according to claim 1 or 2 wherein the distributor has at least two outlet ports each connected to the piping to deliver the paste-form product to at least two separate cutting means and wherein the distributor comprises a rotary plug which is synchronized with the cutting means for distributing the paste-form product to the at least two outlet ports and the piping for delivery to each cutting means.

8. An apparatus according to claim 3 wherein the distributor has at least two outlet ports each connected to the piping to deliver the paste-form product to at least two separate cutting means and wherein the distributor comprises a rotary plug which is synchronized with the cutting means for distributing the paste-form product to the at least two outlet ports and the piping for delivery to each cutting means.

9. An apparatus according to claim 4 wherein the distributor has at least two outlet ports each connected to the piping to deliver the paste-form product to two separate cutting means wherein the distributor comprises a rotary plug which is synchronized with the cutting means for distributing the paste-form product to the at least two outlet ports and the piping for delivery to each cutting means.

10. An apparatus according to claim 2 wherein the synchronized means for controlling the distributor and cutting means comprises:
a rotatable shaft;
a first gear connected to the rotatable shaft and a gear connected to the distributor for controlling the distributor; and
at least one cam having a groove therein connected to the rotatable shaft and wherein each cam is connected to the actuator of one cutting means by elements comprising a roller for running in the groove of the cam, an arm which pivots in a fixed axis connected to the roller for carrying the roller, a crank which is connected to the arm and which has an arcuate groove, a link rod connected to the crank such that the link rod may move in the arcuate crank groove, an actuator arm connected to the actuator and pivotally connected to the link rod for controlling the cutting means.

11. An apparatus according to claim 10 wherein there are at least two cutting means each connected to means for controlling the cutting means wherein each crank is parallel to a central axis of each actuator and wherein a distance between the axes of the actuators is identical with a distance between the axes of the cranks, wherein the link rods are equal in length and wherein angular opening and closing positions of the actuators are identical.

12. An apparatus according to claim 1 wherein the feed pipe is a coaxial pipe.

13. An apparatus according to claim 1 further comprising an isothermal cover encompassing the feed pipe, distributor and piping to separate the feed pipe, distributor and distributor outlet piping from the distributor and cutting means control means.

14. An apparatus according to claim 13 wherein the isothermal cover has an inner wall adjacent the feed pipe, distributor and piping which is formed of a heat-conducting material and an outer wall which is formed of a heat-insulating material, the walls being separated by a space.

15. An apparatus according to claim 1 or 2 further comprising a tunnel through which the support is positioned for conveying the cut portions for cooling.

16. An apparatus according to claim 15 further comprising a unit for coating cooled portions cooled by the tunnel.

* * * * *